(12) United States Patent
Dlugosch et al.

(10) Patent No.: US 10,235,627 B2
(45) Date of Patent: Mar. 19, 2019

(54) ADAPTIVE CONTENT INSPECTION

(71) Applicant: Micron Technology, Inc., Boise, ID (US)

(72) Inventors: Paul D. Dlugosch, Eagle, ID (US); Harold B Noyes, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 15/618,935

(22) Filed: Jun. 9, 2017

(65) Prior Publication Data
US 2017/0278002 A1 Sep. 28, 2017

Related U.S. Application Data

(63) Continuation of application No. 13/928,171, filed on Jun. 26, 2013, now Pat. No. 9,684,867, which is a continuation of application No. 12/638,767, filed on Dec. 15, 2009, now Pat. No. 8,489,534.

(51) Int. Cl.
*G06N 5/02* (2006.01)
*H04L 29/06* (2006.01)

(52) U.S. Cl.
CPC ......... *G06N 5/022* (2013.01); *H04L 63/0245* (2013.01)

(58) Field of Classification Search
CPC ............ G06N 5/04; G06N 5/02; G06N 5/022; G06Q 50/01
USPC ........................................................ 706/46
See application file for complete search history.

(56) References Cited

U.S. PATENT DOCUMENTS

| | | | |
|---|---|---|---|
| 5,300,830 | A | 4/1994 | Hawes |
| 5,331,227 | A | 7/1994 | Hawes |
| 6,240,003 | B1 | 5/2001 | McElroy |
| 6,880,087 | B1 | 4/2005 | Carter |
| 6,906,938 | B2 | 6/2005 | Kaginele |
| 6,944,710 | B2 | 9/2005 | Regev et al. |

(Continued)

FOREIGN PATENT DOCUMENTS

| | | |
|---|---|---|
| EP | 1006701 | 6/2000 |
| EP | 2018013 | 1/2009 |

(Continued)

OTHER PUBLICATIONS

Institute of System Security From Malware Signatures to Anti-Virus Assisted Attacks Christian Wressnegger, Kevin Freeman, Fabian Yamaguchi, and Konrad Rieck Computer Science Report No. 2016-03 Technische Universität Braunschweig Institute of System Security pp. 1-28.*

(Continued)

*Primary Examiner* — Michael B Holmes
(74) *Attorney, Agent, or Firm* — Fletcher Yoder, P.C.

(57) ABSTRACT

Methods and apparatus are provided involving adaptive content inspection. In one embodiment, a content inspection processor may identify information with respect to input data and provide the information to a host controller. The host controller may adapt search criteria or other parameters and provide the adapted parameter to the content inspection processor. Other embodiments may include a content inspection processor having integrated feedback, such that results data is fed back to the content inspection processor. The results data may be processed before being provided to the content inspection processor.

24 Claims, 5 Drawing Sheets

(56) References Cited

U.S. PATENT DOCUMENTS

| | | | |
|---|---|---|---|
| 7,089,352 | B2 | 8/2006 | Regev et al. |
| 7,146,643 | B2 | 12/2006 | Dapp et al. |
| 7,392,229 | B2 | 6/2008 | Harris et al. |
| 7,917,684 | B2 | 3/2011 | Noyes et al. |
| 7,970,964 | B2 | 6/2011 | Noyes |
| 8,140,780 | B2 | 3/2012 | Noyes |
| 8,209,521 | B2 | 6/2012 | Noyes et al. |
| 8,214,672 | B2 | 7/2012 | Powlowski |
| 8,281,395 | B2 | 10/2012 | Powlowski |
| 8,402,188 | B2 | 3/2013 | Noyes et al. |
| 9,684,867 | B2 * | 6/2017 | Dlugosch ............ G06N 5/022 |
| 9,734,876 | B2 * | 8/2017 | Noyes ............... G06F 9/3012 |
| 9,747,242 | B2 * | 8/2017 | Brown ............... G06F 15/7867 |
| 9,785,588 | B2 * | 10/2017 | Noyes ............... G06F 13/38 |
| 9,817,678 | B2 * | 11/2017 | Brown ............... G06K 9/00986 |
| 9,836,555 | B2 * | 12/2017 | Noyes ............... G06F 11/3072 |
| 9,866,218 | B2 * | 1/2018 | Noyes ............... G06F 17/5054 |
| 9,870,530 | B2 * | 1/2018 | Brown ............... G06K 9/00986 |
| 9,886,017 | B2 * | 2/2018 | Noyes ............... G06F 15/82 |
| 9,959,474 | B2 * | 5/2018 | Noyes ............... G06F 17/30976 |
| 10,007,486 | B2 * | 6/2018 | Noyes ............... G06F 7/02 |
| 10,019,311 | B2 * | 7/2018 | Noyes ............... G06F 11/1004 |
| 10,020,033 | B2 * | 7/2018 | Noyes ............... G06F 9/3012 |
| 10,067,901 | B2 * | 9/2018 | Brown ............... G06F 15/7867 |
| 2004/0044907 | A1 | 3/2004 | Sun |
| 2006/0136570 | A1 | 6/2006 | Pandya |
| 2007/0075878 | A1 | 4/2007 | Furodet et al. |
| 2007/0127482 | A1 | 6/2007 | Harris et al. |
| 2007/0282833 | A1 | 12/2007 | McvMillen et al. |
| 2009/0141634 | A1 | 6/2009 | Rothstein et al. |
| 2010/0057695 | A1 | 3/2010 | Kirovski et al. |
| 2010/0100691 | A1 | 4/2010 | Noyes et al. |
| 2010/0115347 | A1 | 5/2010 | Noyes |
| 2010/0115621 | A1 | 5/2010 | Staniford et al. |
| 2010/0138432 | A1 | 6/2010 | Noyes |
| 2010/0138575 | A1 | 6/2010 | Noyes |
| 2010/0138634 | A1 | 6/2010 | Noyes |
| 2010/0138635 | A1 | 6/2010 | Noyes |
| 2010/0174887 | A1 | 7/2010 | Pawlowski |
| 2010/0185647 | A1 | 7/2010 | Noyes |
| 2010/0332809 | A1 | 12/2010 | Noyes |
| 2011/0314052 | A1 | 12/2011 | Francis et al. |

FOREIGN PATENT DOCUMENTS

| | | |
|---|---|---|
| JP | 04167069 | 6/1992 |
| JP | 10228485 | 8/1998 |
| JP | 2004038273 | 2/2004 |
| JP | 2004054330 | 2/2004 |
| JP | 2006350749 | 12/2006 |
| JP | 2007208861 | 8/2007 |
| JP | 2009193203 | 8/2009 |
| JP | 2009223908 | 10/2009 |
| TW | I263920 | 10/2006 |
| WO | 2009130203 | 10/2009 |

OTHER PUBLICATIONS

IEEE Xplore Digital Library SigFree: A Signature-Free Buffer Overflow Attack Blocker IEEE Transactions on Dependable and Secure Computing ( vol. 7 , Issue: 1 , Jan.-Mar. 2010) pp. 65-79 Xinran Wang, Chi-Chun Pan, Peng Liu, Sencun Zhu.*

IEEE Xplore Digital Library Semantics-aware malware detection 2005 IEEE Symposium on Security and Privacy (S&P'05) IEEE Xplore: May 23, 2005 M. Christodorescu, S. Jha, S.A. Seshia, D. Song, R.E. Bryant pp. 1-15.*

IEEE Xplore Digital Library EvilSeed: A Guided Approach to Finding Malicious Web Pages 2012 IEEE Symposium on Security and Privacy IEEE Xplore: Jul. 9, 2012 L. Invernizzi, P. M. Comparetti, S. Benvenuti, C. Kruegel, M. Cova, G. Vigna pp. 1-15.*

Beesley, K. R.; Arabic Morphology Using Only Finite-State Operations; Xerox Research Centre Europe; pp. 50-57 (1998).

Bird, S. et al.; One-Level Phonology: Autosegmental Representations and Rules as Finite Automata; Association for Computational Linguistics; University of Edinburgh; vol. 20; No. 1; pp. 55-90 (1994).

Bispo, J. et al.; Regular Expression Matching for Reconfigurable Packet Inspection; IEEE (2006).

Bispo, J. et al.; Synthesis of Regular Expressions Targeting FPGAs: Current Status and Open Issues; IST/INESC-ID, Libson, Portugal; pp. 1-12 (2007).

Brodie, B. et al.; A scalable Architecture for High-Throughput Regular-Expression Pattern Matching; Exegy Inc.; pp. 1-12 (2006).

Clark, C.; Design of Efficient FPGA Circuits for Matching Complex Patterns in Network Intrusion Detection Systems (Master of Science Thesis); Georgia Institute of Technology; pp. 1-56; (Dec. 2003).

Clark, C.; A Unified Model of Pattern-Matching Circuits for Field-Programmable Gate Arrays [Doctoral Dissertation]; Georgia Institute of Technology; pp. 1-177 (2006).

Clark, C. et al.; Scalable Pattern Matching for High Speed Networks; Proceedings of the 12th Annual IEEE symposium on Field-Programmable Custom Computing Machines (FCCM'04);Georgia Institute of Technology; pp. 1-9 (2004).

Clark, C. et al.; A Unified Model of Pattern-Matching Circuit Architectures; Tech Report GIT-CERCS-05-20; Georgia Institute of Technology; pp. 1-17 (2005).

Fide, S.; String Processing in Hardware; Scalable Parallel and Distributed Systems Lab; Proceedings of the 12th Annual IEEE symposium on Field-Programmable Custom Computing Machines (FCCM'04);School of Electrical and Computer Engineering; Georgia Institute of Technology; pp. 1-9 (2004).

Fisk, M. et al.; Applying Fast String Matching to Intrusion Detection; Los Alamos National Laboratory; University of California San Diego; pp. 1-21 (2001).

Korenek, J.; Traffic Scanner-Hardware Accelerated Intrusion Detection System; http://www.liberouter.org/ (2006).

Kumar, S. et al.; Curing Regular Expressions matching Algorithms from Insomnia, Amnesia, and Acaluia; Department of Computer Science and Engineering; Washington University in St. Louis; pp. 1-17 (Apr. 27, 2007).

Lipovski, G.; Dynamic Systolic Associative Memory Chip; IEEE; Department of Electrical and Computer Engineering; University of Texas at Austin; pp. 481-492 (1990).

Lin, C. et al.; Optimization of Pattern Matching Circuits for Regular Expression on FPGA; IEEE Transactions on Very Large Scale Integrations Systems; vol. 15, No. 12, pp. 1-6 (Dec. 2007).

Schultz, K. et al.; Fully Parallel Integrated CAM/RAM Using Preclassification to Enable Large Capacities; IEEE Journal on Solid-State Circuits; vol. 31; No. 5; pp. 689-699 (May 1996).

Shafai, F. et al.; Fully Parallel 30-MHz, 2.5-Mb CAM; IEEE Journal of Solid-State Circuits, vol. 33; No. 11; pp. 1690-1696 (Nov. 1998).

Sidhu, R. et al.; Fast Regular Expression Pattern Matching using FPGAs; Department of EE-Systems; University of Southern California; pp. 1-12 (2001).

Wada, T.; Multiobject Behavior Recognition Event Driven Selective Attention Method; IEEE; pp. 1-16 (2000).

Yu, F.; High Speed Deep Packet Inspection with Hardware Support; Electrical Engineering and Computer Sciences; University of California at Berkeley; pp. 1-217 (Nov. 22, 2006).

Freescale and Kaspersky® Accelerated Antivirus Solution Platform for OEM Vendors; Freescale Semiconductors Document; pp. 1-16 (2007).

Hurson A. R.; VLSI Design for the Parallel Finite State Automation and Its Performance Evaluation as a Hardware Scanner; International Journal of Computer and Information Sciences, vol. 13, No. 6. (1984).

Harris, U.S. Appl. No. 60/652,738, filed Feb. 12, 2005, "Means and Mechanism for Finding Meaningful Information in Databases or Data Sets by Topical Content Patterns at Speeds Exceeding Conventional Computers".

Taiwan Search Report dated Sep. 23, 2013 in Counterpart Taiwan Patent Application No. 099144051.

(56) References Cited

OTHER PUBLICATIONS

Masayuki Nakae, A Behavior-Based Intrusion Prevention System for Web-servers, Research Report, Information rocessing Society of Japan, 2002-CSEC-19-3, Japan, IPSJ, Dec. 20, 2002, vol. 2002 No. 122, p. 13-18.

* cited by examiner

ADAPTIVE CONTENT INSPECTION

CROSS-REFERENCE TO RELATED APPLICATION

This application is a continuation of U.S. patent application Ser. No. 13/928,171, which was filed on Jun. 26, 2013, which is a continuation of U.S. patent application Ser. No. 12/638,767, which was filed on Dec. 15, 2009, now U.S. Pat. No. 8,489,534 which issued Jul. 16, 2013 and is herein incorporated by reference

BACKGROUND

Field of Invention

Embodiments of the invention relate generally to content inspection processors, and, more specifically, to programming and operation of such processors.

Description of Related Art

In the field of computing, content inspection tasks are increasingly challenging. For example, pattern-recognition, a subset of content inspection tasks, may become more challenging to implement because of larger volumes of data and the number of patterns that users wish to identify. For example, spam or malware are often detected by searching for content, e.g., patterns in a data stream, such as particular phrases or pieces of code. The number of patterns increases with the variety of spam and malware, as new patterns may be implemented to search for new variants. Searching a data stream for each of these patterns can form a computing bottleneck. Often, as the data stream is received, it is searched for each pattern, one at a time. The delay before the system is ready to search the next portion of the data stream increases with the number of patterns. Thus, content inspection may slow the receipt of data.

Further, in many pattern recognitions, searches, or other content inspection tasks, the content inspection process is performed using (e.g., according to, against, with respect to, etc.) a fixed and defined set of search criteria. The device performing the content inspection process does not adjust to changes in input data and/or results data.

DETAILED DESCRIPTION

Figure 1:
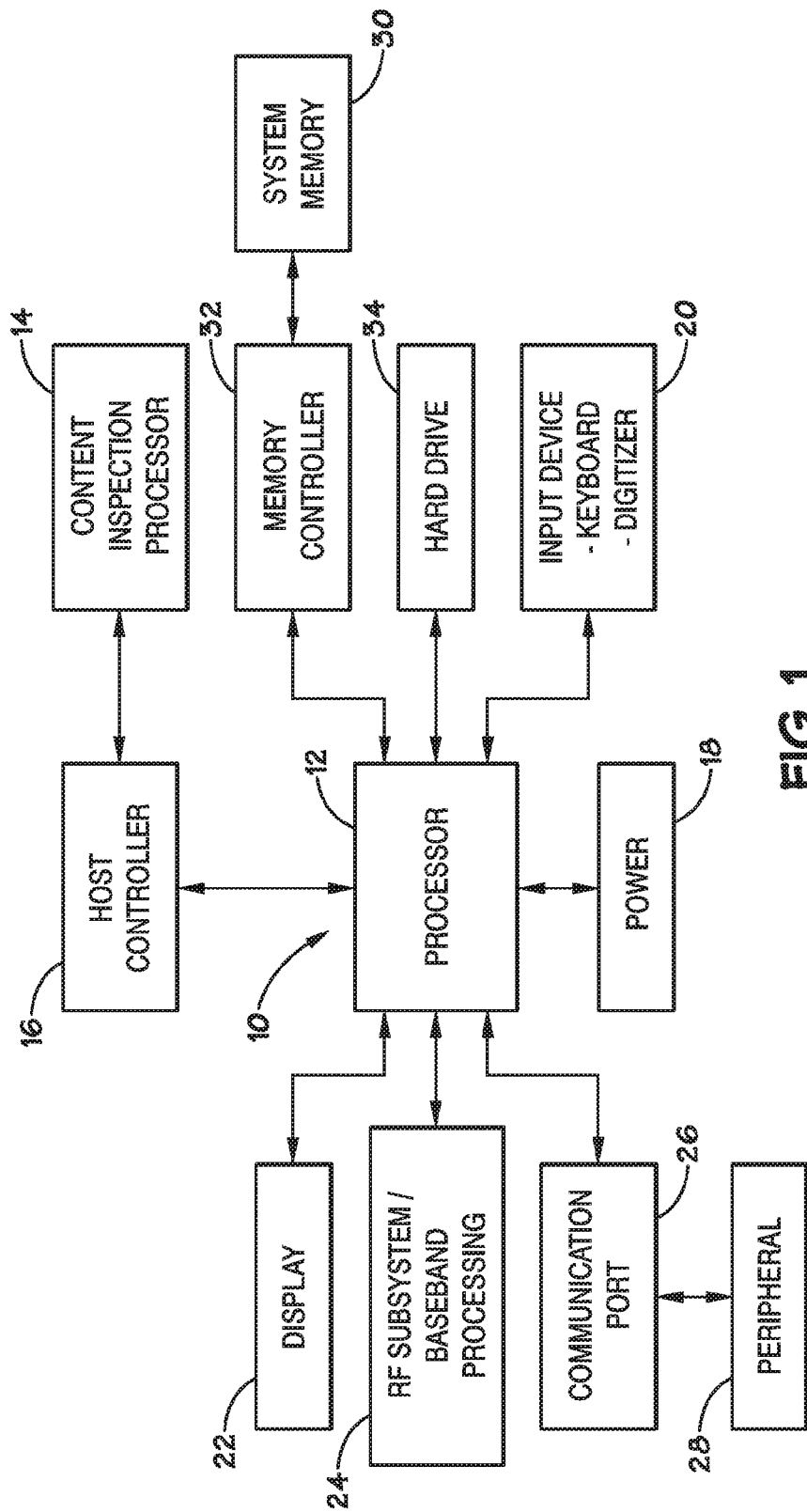
FIG. 1 is a block diagram of an embodiment of an apparatus having a content inspection processor in accordance with embodiments of the present invention.

FIG. 1 is a block diagram depicting an embodiment of an electronic apparatus, such as a device or system, generally designated by reference numeral 10. The apparatus 10 may be any of a variety of types such as a computer, pager, cellular phone, personal organizer, portable audio player, network device (e.g., router, firewall, switch, or any combination thereof), control circuit, camera, etc. The apparatus 10 may include apparatus processor 12, such as a microprocessor, to control the processing of functions and requests in the apparatus 10. Further, the processor 12 may comprise a plurality of processors that share apparatus control. The processor 12 may be a general purpose processor or a specifically designed processor for the functions and requests of the apparatus 10.

The apparatus 10 may also include a content inspection processor 14. The content inspection processor 14 may be one or more processors configured to inspect data using search criteria. For example, the content inspection processor 14 may be capable of using search criteria to match a pattern in a data set or a data stream provided to the content inspection processor 14. The content inspection processor 14 may be coupled to and controlled by processing logic, such as a host controller 16 that communicates with the content inspection processor 14 over one or more buses. The host controller 16 may program the content inspection processor 14 with search criteria or any other parameters used by the content inspection processor 14 during operation. The content inspection processor 14 may provide the primary or secondary functions of the apparatus 10. In one embodiment, the content inspection processor 14 may be a pattern-recognition processor as described in U.S. patent application Ser. No. 12/350,132.

The apparatus 10 typically includes a power supply 18. For instance, if the apparatus 10 is a portable system, the power supply 18 may advantageously include permanent batteries, replaceable batteries, and/or rechargeable batteries. The power supply 18 may also include an AC adapter, so the apparatus 10 may be plugged into a wall outlet, for instance. The power supply 18 may also include a DC adapter such that the apparatus 10 may be plugged into a vehicle cigarette lighter, for instance.

Various other devices may be coupled to the processor 12, depending on the functions that the apparatus 10 performs. For instance, an input device 20 may be coupled to the processor 12. The input device 20 may include buttons, switches, a keyboard, a light pen, a stylus, a mouse, and/or a voice recognition system, for instance. A display 22 may also be coupled to the processor 12. The display 22 may include an LCD, a CRT, LEDs, and/or any other suitable display, for example.

Furthermore, an RF sub-system/baseband processor 24 may also be coupled to the processor 12. The RF sub-system/baseband processor 24 may include an antenna that is coupled to an RF receiver and to an RF transmitter (not shown). A communications port 26 may also be coupled to the processor 12. The communications port 26 may be adapted to be coupled to one or more peripheral devices 28 such as a modem, a printer, a computer, or to a network, such as a local area network, remote area network, intranet, or the Internet, for instance.

Generally, memory is coupled to the processor 12 to store and facilitate execution of various programs. For instance, the processor 12 may be coupled to system memory 30 through a memory controller 32. The system memory 30 may include volatile memory, such as Dynamic Random Access Memory (DRAM) and/or Static Random Access Memory (SRAM). The system memory 30 may also include non-volatile memory, such as read-only memory (ROM), flash memory of various architectures (e.g., NAND memory, NOR memory, etc.), to be used in conjunction with the volatile memory. Additionally, the apparatus 10 may include a hard drive 34, such as a magnetic storage device.

Figure 2:
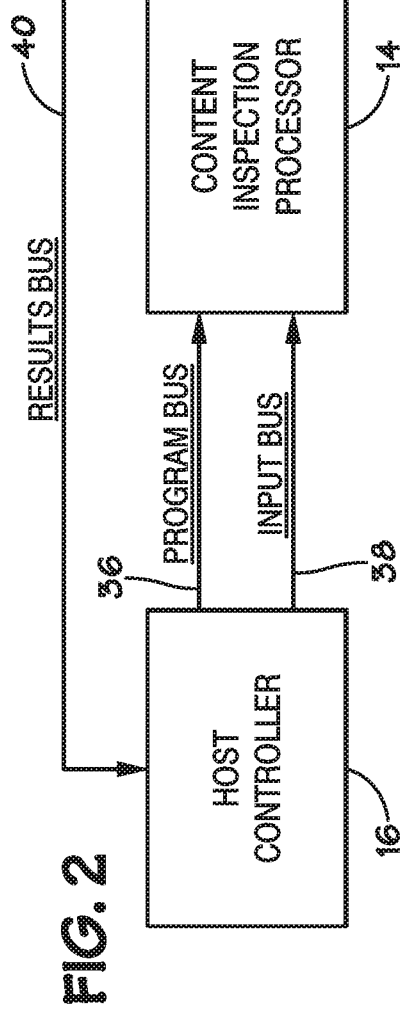
FIG. 2 is a block diagram illustrating operation of a host controller and a content inspection processor in accordance with an embodiment of the present invention.

FIG. 2 depicts operation of the host controller 16 and the content inspection processor 14 in accordance with an embodiment of the present invention. As shown in FIG. 2, the host controller 16 may communicate with the content inspection processor 14 over a program bus 36 and an input bus 38. The input bus 38 transfers the input data to be inspected by the content inspection processor 14. In some embodiments, the input data may be transferred as a fixed set of data (referred to as "static data") or streaming data (referred to as "dynamic data"). The input data may be received from any source, such as databases, sensors, networks, etc, coupled to the apparatus 10. For example, the input data may be received from another device or system in communication with the apparatus 10 over the communication port 26.

The program bus 36 transfers programming data from the host controller 16 to the content inspection processor 14. This program data is used to program the content inspection processor 14, with the operating parameters used during the inspection process. For example, in one embodiment the programming data may include search criteria (e.g., patterns or other criteria of interest) used by the content inspection processor 14, to match to the input data received over the input bus 38. The search criteria may include one or more patterns of any length and complexity.

The output of the content inspection processor 14 may be transferred over a results bus 40. The results bus 40 may provide the results data (e.g., search results) from processing of the input data by the content inspection processor 14 to the host controller 16. For example, in some embodiments the results data provided over the results bus 40 may indicate a match, may indicate "no match," and may include the particular search criteria that were matched and/or the location in the input data where the match occurred. In some embodiments, the content inspection processor 14 may notify the host controller 16 of any specific results data by transferring an output over the results bus 40.

In some embodiments, the input bus 38, program bus 36, and results bus 40 may be physically distinct buses, or any combination of the input bus 38, program bus 36, and results bus 40 may be physically implemented on a single bus interface. For example, in such an embodiment the single bus interface may be multiplexed or controlled via any suitable technique to transmit the different types of data provided to and received from the content inspection processor 14.

Figure 3:
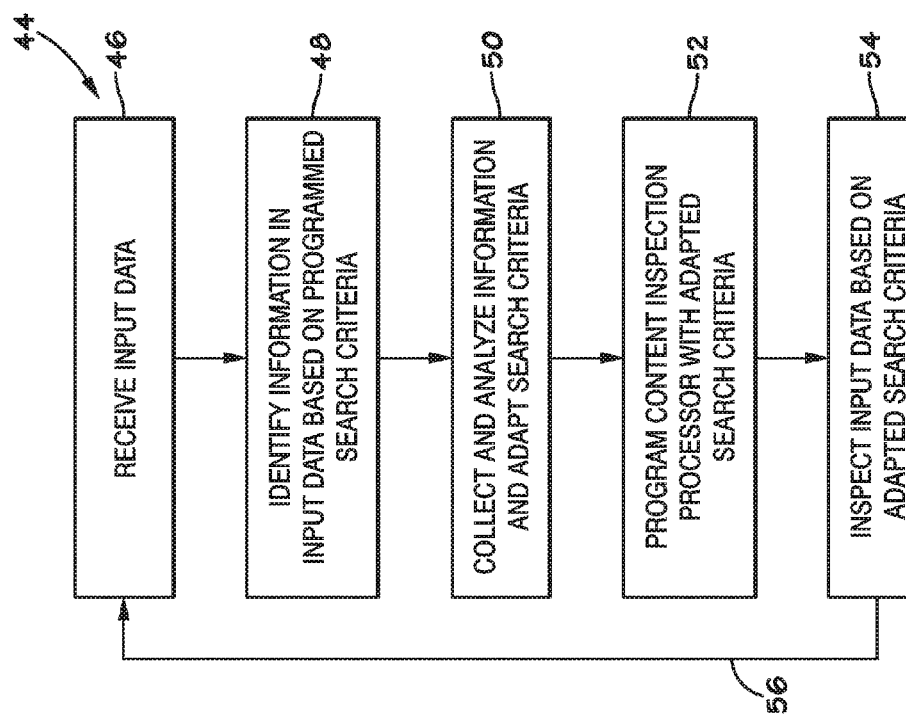
FIG. 3 is a flowchart of a dynamic adaptation process for a content inspection processor in accordance with an embodiment of the present invention.

FIG. 3 depicts a dynamic adaptation process 44 for the content inspection processor 14 in accordance with an embodiment of the present invention. Initially, as shown in block 46, the content inspection processor 14 may receive input data (e.g., a data set or data stream), such as over the input bus 38. The content inspection processor 14 may identify information with respect to the input data provided to the content inspection processor 14 (block 48). Such information may include an identifying characteristic of the data, format of the data, a protocol of the data, and/or any other type of identifying information. After identifying information with respect to the input data, the information may be collected, analyzed, and used to adapt the search criteria and/or other operating parameters of the content inspection processor (block 50). For example, the host controller 16 or other processing logic may collect, analyze, and/or adapt the search criteria based on an identifying characteristic of the input data. The content inspection processor 14 may then be programmed with the adapted search criteria (block 52). Finally the content inspection processor 14 may inspect input data using the adapted search criteria (block 54). As described below, this process 44 may be iterative, so that additional identifying information may be found in the input data to allow for further adaptation of the search criteria (as shown by arrow 56).

Figure 4:
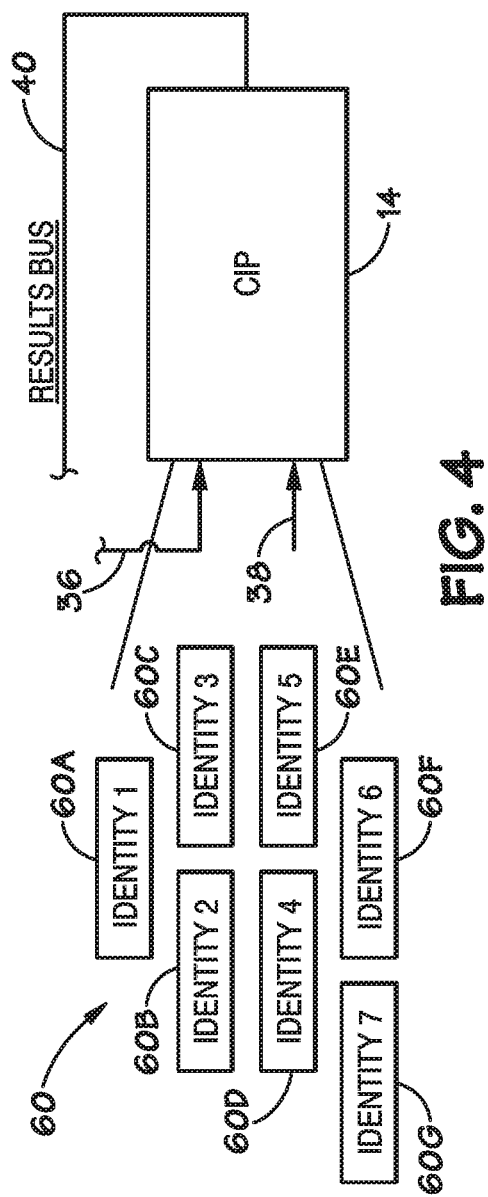
FIG. 4 depicts a content inspection processor having adaptable programming according to an embodiment of the present invention.
Figure 5:
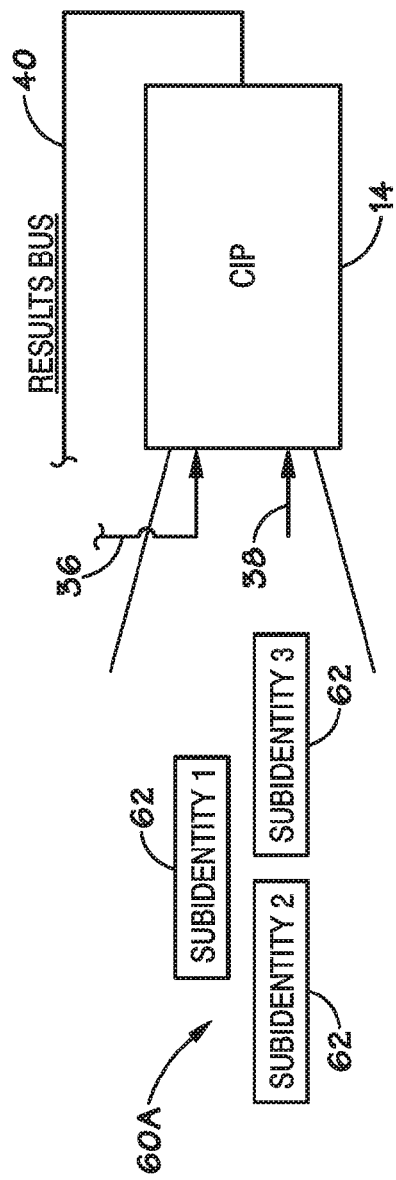
FIG. 5 depicts a second level of adaptable programming of a content inspection processor according to an embodiment of the present invention.
Figure 6:
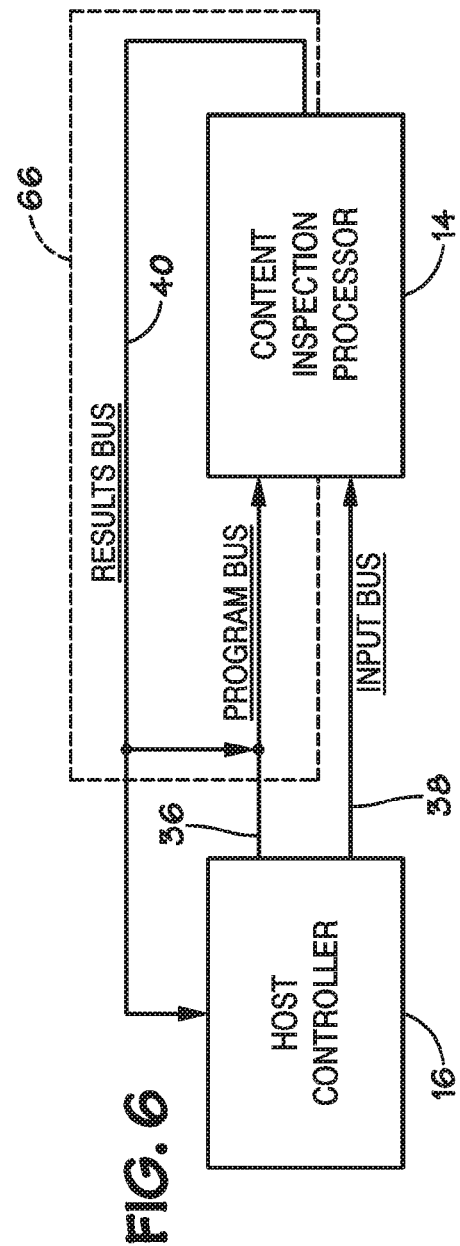
FIG. 6 depicts a content inspection processor having integrated feedback in accordance with an embodiment of the present invention.

FIGS. 4-6 depict different techniques for dynamic adaptive programming of the content inspection processor, to provide the content inspection processor the ability to adapt to the input data during run-time. Embodiments of the content inspection processor may include any one of or combination of the techniques described below in FIGS. 4-6.

FIG. 4 depicts the content inspection processor 14 having adaptable programming (e.g., search criteria) according to an embodiment of the present invention. As shown in FIG. 4, the content inspection processor 14 includes the ability to dynamically adapt search criteria based on identifying information with respect to the input data.

For example, FIG. 4 depicts an embodiment in which the content inspection processor 14 may receive many possible types of input data 60 (e.g., data sets or data streams). Each type of input data 60 may have different identifying information (depicted as identities 1, 2, 3, etc. in FIG. 4). For example, input data 60A may have identity 1, input data 60B may have identity 2, input data 60C may have identity 3, and so on. In one embodiment, for example, the content inspection processor 14 may perform natural language translation. Incoming input data 60 may include any possible natural language for translation by the content inspection processor. In such an embodiment, the identities may be different natural languages, such that identity 1 is French, identity 2 is Spanish, identity 3 is English, identity 4 is Russian, identity 5 is Polish, identity 6 is Mandarin Chinese, identity 7 is Japanese, etc.

The content inspection processor 14 may be programmed with search criteria to identify information with respect to the input data, such as by matching certain characteristics of the input data using the search criteria. Further, the content inspection processor 14 may be programmed with the search criteria based on the function of the content inspection processor 14 (e.g., natural language translation, network firewall, etc.) Thus, in an embodiment providing natural language translation, the content inspection processor 14 may be programmed to identify the natural language of the incoming input data 60. In such an embodiment, the content inspection processor 14 may not have enough memory to store all of the search criteria for each type of input data 60 (e.g., each possible natural language). After the input data 60 has been identified, the identity may be provided to the host controller 16 over the results bus 40. The host controller 16 may then adapt the search criteria based on the identity of the input data 60 and program the content inspection processor 14 with adapted search criteria for that specifically identified type of input data. For example, if the input data is identified as English, the search criteria may be adapted to match patterns of interest in English.

Further, any number of levels of adaptability may be provided by the content inspection processor 14. For example, FIG. 5 depicts an additional level of adaptability based on the identity of the input data. After identifying information with respect to the input data (such as identifying the input data 60A as "identity 1"), the content inspection processor 14 may be programmed with adapted search criteria to identify additional information (e.g., a sub-identity) with respect to of the input data 60A. As shown in FIG. 5, the input data 60A may have additional potentially identifying information 62, such as "sub-identity 1," "sub-identity 2," "sub-identity 3," etc. For example, in an embodiment identifying a specific natural language (e.g., identifying input data 60A as "English"), after identifying a language the content inspection processor 14 may then identify a regional dialect, accent, or other sub-identity of the identified language. Once the content inspection processor 14 has identified this sub-identity, this sub-identity may be provided to the host controller 14 over the results bus 40. The host controller 16 can then further adapt the search criteria and program the content inspection processor 14 with the further adapted search criteria. This process may repeat for any desired level of sub-identifiers of input data. Advantageously, successive adaptation of the search criteria described above enables the content inspection processor to achieve higher levels of accuracy for the inspection process.

In other embodiments, the identification of the input data may be used to enhance network security. For example, the content inspection processor 14 may identify code fragments in the input data that correspond to code fragments commonly found in close proximity to signatures of attack viruses, worms, or other malware. After such code fragments are identified, the host controller 16 may adapt the search criteria to match the attack signature known to be associated with such code fragments. These adapted search criteria may be provided to the content inspection processor 14 so that the content inspection processor 14 is better able to search for the respective attack signature associated with those code fragments, increasing accuracy of the inspection process.

In other embodiments, the identifying information searched for in the input data may be a network protocol, such as hypertext transfer protocol (HTTP), file transfer protocol (FTP), DNS request, etc. By identifying the protocol and providing this identity to the host controller 16, the host controller 16 may adapt search criteria for a specific protocol and program the content inspection processor 14 accordingly. In other embodiments, the identifying information (e.g., identity) searched for may be encoding/decoding information of the input data, where the identifying information of the input data is fed back to an encoder or decoder to adjust the encoding or decoding process. For example, a video or other media encoder may use the content inspection processor 14 to inspect the output of the encoding process and provide feedback to the encoder to enable the encoder to dynamically adapt the encoding process. In yet other embodiments, the identifying information may be any digitally encoded information.

In other embodiments, the content inspection processor 14 may include feedback mechanisms to provide dynamic adaptability to the content inspection processor 14 based on the input data. FIG. 6 depicts the content inspection processor 14 having integrated feedback in accordance with an embodiment of the present invention. As shown in FIG. 6, the results data from the content inspection processor 14 may be transferred over the results bus 40 into the program bus 36, creating a feedback loop 66. This feedback loop 66 may enable the content inspection processor 14 to dynamically adapt to the input data based on the results of an inspection process (e.g., based on the input data that matched or did not match search criteria programmed into the content inspection processor 14).

Figure 7:
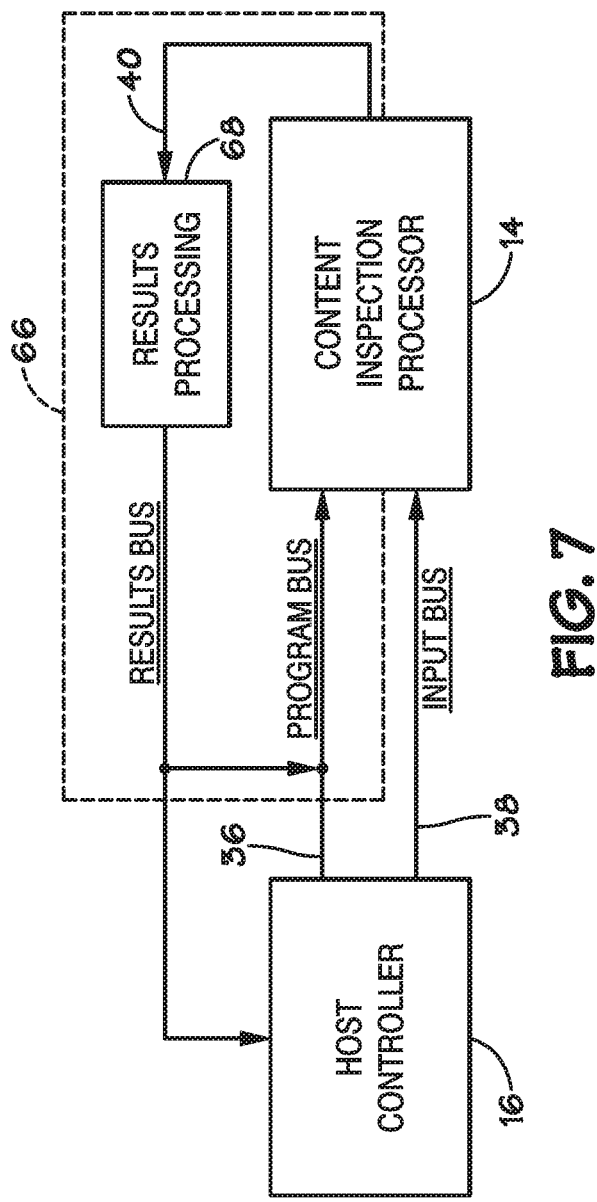
FIG. 7 depicts a content inspection processor having integrated feedback with results processing in accordance with another embodiment of the present invention.

In other embodiments, the feedback loop may include additional post-results processing. FIG. 7 depicts a content inspection processor 14 having integrated feedback with results processing in accordance with another embodiment of the present invention. As shown in FIG. 7, the results bus 40 from the content inspection processor 14 may be coupled to results processing logic 68. The results data output from the content inspection processor 14 may be processed by the results processing logic 68 before being provided to the program bus 36. The results processing logic 68 may include any suitable hardware and/or software logic, such as an additional content inspection processor to perform inspection of the results, a lookup operation to fetch new search criteria from local storage, etc.

Figure 8:
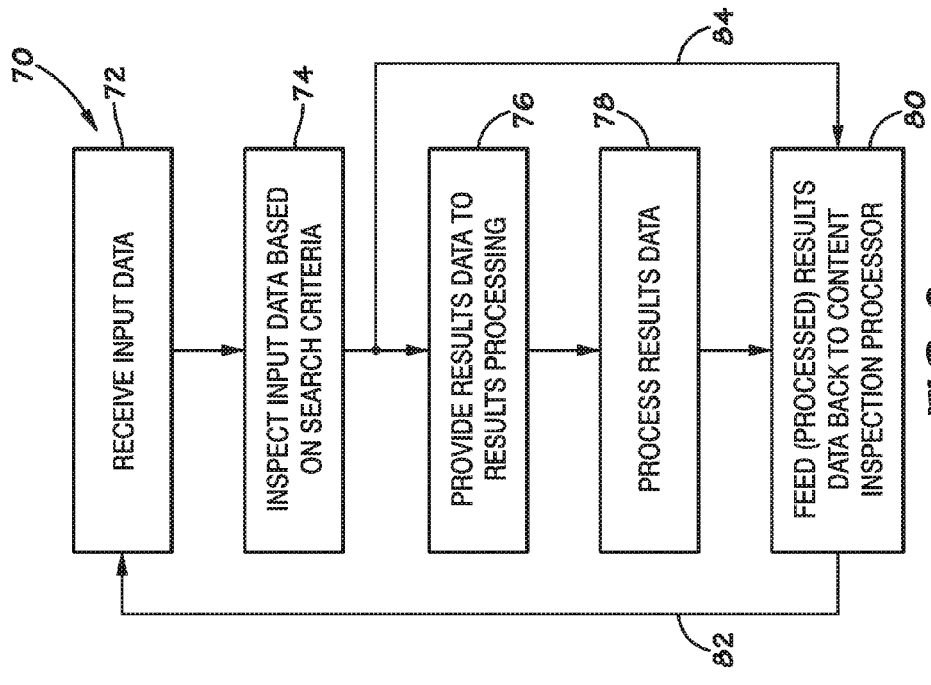
FIG. 8 depicts a dynamic adaptation process of a content inspection processor with integrated feedback in accordance with an embodiment of the present invention.

FIG. 8 depicts a dynamic adaptation process 70 of a content inspection processor with integrated feedback in accordance with an embodiment of the present invention. Initially, the content inspection processor 14 receives input data (block 72), such as a data set or data stream received over the input bus 38. The input data may be inspected using to the search criteria programmed into the content inspection processor 14 (block 74). In some embodiments, as discussed above, this search criteria may be used to identify information with respect to the input data. In some embodiments, the results data of the inspection process may be provided to results processing logic 68 (block 76). The results data may be processed by the results processing logic 68 (block 78). The processed results data may be fed back into the content inspection processor 14, such as through the program bus 36 (block 80). As shown by arrow 82, the process 70 may continue to provide continuous feedback to the content inspection processor 14. In other embodiments, as also discussed above, the results data may be provided directly to the content inspection processor 14 without processing (as shown by arrow 84), such as by feeding the results data into the program bus 36.

What is claimed is:

1. An apparatus, comprising:
   a communication port configured to communicatively couple the apparatus to a communication network to enable the apparatus to receive input data from the communication network;
   a content inspection processor communicatively coupled to the communication port, wherein the content inspection processor is configured to:
   inspect the input data using a first search criteria to detect whether a first code fragment associated with a first one or more attack signatures is present in the input data; and
   output first results data that indicates whether the first code fragment is detected in the input data; and
   processing logic communicatively coupled to the content inspection processor, wherein the processing logic is configured to:
   receive the first results data from the content inspection processor; and
   when the first results data indicates that the first code fragment is detected in the input data:
   determine a second search criteria based on the first one or more attack signatures associated with the first code fragment; and
   program the content inspection processor to inspect the input data using the second search criteria to enable the apparatus to detect whether malware is present in the input data before execution.

2. The apparatus of claim 1, wherein:
the content inspection processor is configured to:
    inspect the input data using a third search criteria to identify a natural language of the input data; and
    output second results data that indicates the natural language of the input data; and
the processing logic is configured to:
    receive the second results data from the content inspection processor;
    determine a fourth search criteria based at least in part on a language pattern used in the natural language of the input data; and
    program the content inspection processor to inspect the input data using the fourth search criteria to enable the apparatus to translate the natural language of the input data into a different language.

3. The apparatus of claim 2, wherein the processing logic is configured to program the content inspection processor to inspect the input data using the third search criteria after the apparatus determines that malware is not present in the input data.

4. The apparatus of claim 2, wherein the content inspection processor is configured to:
inspect the input data using the fourth search criteria to detect presence of the language pattern in the input data; and
output third results data that indicates whether the language pattern is detected in the input data and, when the language pattern is detected in the input data, location of the language pattern in the input data to enable the apparatus to translate the language pattern from the natural language of the input data into the different language.

5. The apparatus of claim 2, wherein:
the language pattern is used in a regional dialect of the natural language of the input data; and
the apparatus is configured to detect that the input data uses the regional dialect when the third results data indicates that the language pattern is detected in the input data.

6. The apparatus of claim 1, wherein:
the content inspection processor is configured to:
    inspect the input data using a third search criteria to identify a network protocol used by the input data; and
    output second results data that indicates the network protocol used by the input data; and
the processing logic is configured to:
    receive the second results data from the content inspection processor;
    determine the first search criteria based at least in part on the network protocol used by the input data; and
    program the content inspection processor to inspect the input data using the first search criteria.

7. The apparatus of claim 6, wherein the processing logic is configured to:
determine the first search criteria to enable the content inspection processor to detect whether the first code fragment associated with the first one or more attack signatures is present in the input data when the input data uses a first network protocol and the first one or more attack signatures are implemented to be communicated using the first network protocol; and
determine the first search criteria to enable the content inspection processor to detect whether a second code fragment associated with a second one or more attack signature is present in the input data when the input data uses a second network protocol and the second one or more attack signatures are implemented to be communicated using the second network protocol.

8. The apparatus of claim 1, wherein:
the content inspection processor is configured to:
    inspect the input data using the first search criteria to detect whether a second code fragment associated with a second one or more attack signatures is present in the input data; and
    output the first results data to indicate whether the second code fragment is detected in the input data; and
the processing logic is configured to determine the second search criteria based on the second one or more attack signatures associated with the second code fragment when the first results data indicates that the second code fragment is detected in the input data.

9. The apparatus of claim 1, comprising:
a first bus coupled between the content inspection processor and the processing logic, wherein the first bus is configured to:
    receive the results data from the content inspection processor; and
    provide the results data to the processing logic; and
a second bus coupled between the processing logic and the content inspection processor, wherein the second bus is configured to:
    receive the second search criteria from the processing logic; and
    provide the second search criteria to the content inspection processor.

10. A method, comprising:
receiving, using a content inspection processor implemented in an electronic device, input data from a communication network communicatively coupled to the electronic device;
inspecting, using the content inspection processor, the input data using a first search criteria to detect whether a first code fragment associated with a first one or more attack signatures is present in the input data;
outputting, using the content inspection processor, first results data that indicates whether the first code fragment is detected in the input data to a host controller communicatively coupled to the content inspection processor; and
when the first results data indicates that the first code fragment is detected in the input data:
    determining, using the host controller, a second search criteria based on the first one or more attack signatures associated with the first code fragment and
    programming, using the host controller, the content inspection processor to inspect the input data using the second search criteria to enable the electronic device to detect whether malware is present in the input data before execution.

11. The method of claim 10, comprising:
inspecting, using the content inspection processor, the input data using a third search criteria to identify a network protocol used by the input data;
outputting, using the content inspection processor, second results data that indicates the network protocol used by the input data to the host controller;
determining, using the host controller, the first search criteria based at least in part on the network protocol used by the input data; and programming, using the host controller, the content inspection processor to inspect the input data using the first search criteria.

12. The method of claim 11, wherein determining the first search criteria comprises determining the first search criteria to enable the content inspection processor to detect whether the first code fragment associated with the first one or more attack signatures is present in the input data when the input data uses a first network protocol and the first one or more attack signatures are expected to be communicated using the first network protocol.

13. The method of claim 12, wherein determining the first search criteria comprises determining the first search criteria to enable the content inspection processor to detect whether a second code fragment associated with a second one or more attack signature is present in the input data when the input data uses a second network protocol and the second one or more attack signatures are expected to be communicated using the second network protocol.

14. The method of claim 13, wherein:
the first network protocol comprises a hypertext transfer protocol; and
the second network protocol comprises a file transfer protocol.

15. The method of claim 10, comprising:
inspecting, using the content inspection processor, the input data using a third search criteria to identify a natural language of the input data;
outputting, using the content inspection processor, second results data that indicates the natural language of the input data to the host controller;
determining, using the host controller, a fourth search criteria based at least in part on a language pattern used in the natural language of the input data; and
programming, using the host controller, the content inspection processor to inspect the input data using the fourth search criteria to enable the electronic device to translate the natural language of the input data into a different language.

16. The method of claim 15, wherein programming the content inspection processor to inspect the input data using the third search criteria comprises programming the content inspection processor to inspect the input data using the third search criteria after the electronic device determines that malware is not present in the input data.

17. The method of claim 15, comprising:
inspecting, using the content inspection processor, the input data using the fourth search criteria to detect presence of the language pattern in the input data; and
outputting, using the content inspection processor, third results data that indicates whether the language patter is detected in the input data, location of the language pattern in the input data using and, when the language pattern is detected in the input data, location of the language pattern in the input data to enable the electronic device to translate the language pattern from the natural language of the input data into the different language.

18. The method of claim 15, comprising detecting, using the electronic device, that the input data uses a regional dialect of the natural language when the language pattern in used in the regional dialect of the natural language and the third results data indicates that the language pattern is detected in the input data.

19. An apparatus, comprising:
a content inspection processor configured to:
inspect data using a first search criteria to identify a natural language used by the data; and
output first results data that indicates the natural language used by the data;
memory configured to store a second search criteria comprising a first language pattern used in a first natural language and a third search criteria comprising with a second language pattern used in a second natural language; and
a host controller communicatively coupled to the content inspection processor and the memory, wherein the host controller is configured to:
receive the first results data from the content inspection processor; and
program the content inspection processor to inspect the data using the second search criteria when the first results data indicates that the data uses the first natural language to enable the apparatus to translate an occurrence of the first language pattern in the data to a different language.

20. The apparatus of claim 19, comprising:
a communication port configured to receive the data from a communication network; and
a display configured to display a visual representation of the first language pattern translated into the different language when the first results data indicates that the data uses the first natural language.

21. The apparatus of claim 20, wherein:
the content inspection processor is configured to:
inspect the data using a fourth search criteria to determine whether a code fragment associated with one or more attack signatures is present in the data; and
output second results data that indicates whether the code fragment is detected in the data; and
the host controller is configured to:
receive the second results data from the content inspection processor; and
when the second results data indicates that the code fragment is detected in the data:
determine a fifth search criteria based on the one or more attack signatures associated with the code fragment; and
program the content inspection processor to inspect the data using the fifth search criteria to enable the apparatus to detect whether malware is present in the data before the content inspection processor inspects the data using the first search criteria.

22. The apparatus of claim 19, wherein the host controller is configured to program the content inspection processor to inspect the data using the third search criteria when the first results data indicates that the data uses the second natural language to enable the apparatus to translate an occurrence of the second language pattern in the data to the different language.

23. The apparatus of claim 19, wherein:
the first language pattern is used in a regional dialect of the first natural language; and
the apparatus is configured to detect that the data uses the regional dialect when the first language pattern is detected in the data.

24. The apparatus of claim 19, wherein:
the second search criteria comprises a third language pattern used in the first natural language; and
the host controller is configured to program the content inspection processor to inspect the data using the second search criteria when the first results data indicates that the data uses the first natural language to enable the apparatus to translate an occurrence of the third language pattern in the data to the different language.

\* \* \* \* \*